United States Patent [19]

Matsuda et al.

[11] Patent Number: 5,391,871
[45] Date of Patent: Feb. 21, 1995

[54] SCANNING PROBE MICROSCOPE

[75] Inventors: Hiroshi Matsuda, Isehara; Hisaaki Kawade; Ken Eguchi, both of Yokohama; Yoshihiro Yanagisawa, Isehara; Toshihiko Takeda, Atsugi, all of Japan

[73] Assignee: Canon Kabushiki Kaisha, Tokyo, Japan

[21] Appl. No.: 892,364

[22] Filed: Jun. 2, 1992

[30] Foreign Application Priority Data

Jun. 5, 1991 [JP] Japan .................................. 3-161071

[51] Int. Cl.⁶ .............................................. H01J 37/26
[52] U.S. Cl. .................................... 250/306; 73/105; 369/126
[58] Field of Search .................. 250/306, 307; 73/105; 369/126

[56] References Cited

U.S. PATENT DOCUMENTS

| | | | |
|---|---|---|---|
| 3,903,735 | 9/1975 | Wilson | 73/105 |
| 5,107,112 | 4/1992 | Yanagisawa et al. | 250/306 |

FOREIGN PATENT DOCUMENTS

| | | |
|---|---|---|
| 0240150 | 10/1987 | European Pat. Off. |
| 0338083 | 10/1989 | European Pat. Off. |
| 0351260 | 1/1990 | European Pat. Off. |
| 0421437A2 | 4/1991 | European Pat. Off. |
| 02147803 | 6/1990 | Japan |
| 2147803 | 8/1990 | Japan |
| 2204130A | 11/1988 | United Kingdom |

OTHER PUBLICATIONS

"A three-dimensional surface profile measuring system with a specimen-levelling device" by T. Kanada et al.; Measurement Science and Technology 2(1991) Mar., No. 3, Bristol, BG pp. 191-196.

"Scanning tunneling microscopy" by G. Binnig et al. Helvetica Physica Acta vol. 55, 1982; pp. 728-735.

*Primary Examiner*—Jack I. Berman
*Attorney, Agent, or Firm*—Fitzpatrick, Cella, Harper & Scinto

[57] ABSTRACT

A scanning type probe microscope apparatus for measuring a surface state of a sample by scanning the sample by use of a probe is disclosed. In the apparatus, the sample is inclined relative to a scan direction of the probe by a inclination mechanism. Of a signal component corresponding to the surface state of the sample, a signal component having an optional space frequency is selected to be detected by a detecting circuit. The inclination mechanism is controlled on the basis of a detection result of the detecting circuit.

13 Claims, 5 Drawing Sheets

SCANNING PROBE MICROSCOPE

BACKGROUND OF THE INVENTION

1. Field of the Invention

The present invention relates to a scanning probe microscope having a mechanism for correcting an inclination between a scan plane of a probe and a sample plane, and a recording and reproducing apparatus having a similar mechanism, and an inclination measurement mechanism.

2. Related Background Art

An SXM collectively refers to a technique to measure a surface status of a sample by scanning a probe on a surface of the sample while detecting various mutual actions which depend on a distance between the probe and the sample. It is a measurement method derived from a scanning tunneling microscope (hereinafter referred to as STM) which utilizes a tunneling current, and it is explained by referring the STM. The STM developed by G. Binning et al. [G. Binning et al., Helvetica Physica Acta, 55, 726 (1982)] utilizes a phenomenon that a tunneling current flows when a metal probe approaches a conductive sample at a distance of approximately 1 nm while a voltage is applied therebetween. Since the current very sensitively increases monotonically with the change of the distance between them, the surface status of the sample can be very precisely detected if the sample is scanned while the tunneling current and the height of the probe are detected.

When the surface status of the sample is observed while the probe is scanned on the sample, either a method for measuring the change of the height of the probe while controlling the height of the probe so that the tunneling current is kept constant (constant current mode) or a method for measuring the change of the tunneling current Jt when the probe is scanned while the height thereof is fixed at a constant level (constant height mode) is used. In any case, it is required that the scan of the probe is parallel to the sample plane. For example, when a crystal of highly oriented graphite (HOPG) is observed, a result as shown in FIG. 1 is to be obtained in accordance with the arrangement of atoms.

However, if the sample is arranged obliquely, the surface shape is observed with distortion. If a range of scan of the probe is relatively small, it may be possible to separate a signal caused by an actual structure of the sample surface by use of electrical filter, but when the inclination is large, it is difficult to observe over a sufficiently wide range. For example, in the constant current mode, continuous measurement is not attainable when a total heightwise displacement of the probe due to the inclination of the sample exceeds a heightwise fine adjustment range of the probe.

When the constant height mode is selected, if the sample is inclined, the probe may be too far away from the sample to detect the tunneling current or the probe may contact to the sample. In order to avoid this, a feedback is applied even in the constant height mode so that the detected tunneling current is maintained within a certain range, and the height of the probe is gradually changed. In such a case, the correction beyond the heightwise fine adjustment range of the probe is not attainable.

Even if it is within the range, as far as the scanning surface (hereinafter referred to as XY plane) direction of the probe and the sample surface (hereinafter referred to as X'Y' plane) direction are not parallel to each other, there exists a difference between a displacement of the probe and a real space distance as shown in FIG. 2. Namely, where an angle defined between the sample surface and the scan plane is $\theta$, a change in the height due to the inclination is superimposed on the detected signal. Even if a low frequency component due to the inclination of the sample is cut off by an electrical filter as is done in the prior art to extract a signal produced by a periodical structure of atoms, the distance in the resulting signal is compressed by a factor of $\cos\theta$ because the displacement of the probe scans over a length of $1/\cos\theta$ times on the sample surface. As a result, a distance precision is low, and the larger the observation area is, the larger is a difference between the real space and the scan distance.

This equally applies to the STM which has the same movement mechanisms of the probe and the sample as those of the STM. Further, in a high density recording and reproducing apparatus of a molecule order by using the SXM, the anticoincidence or the antiparallelism between the XY plane and the X'Y' plane lose a precision of recording, reproduction and erasing.

Japanese Laid-Open Patent Application No. 2-147803 proposes an STM having a mechanism for manually rotating a sample in order to solve the above problem, but it is difficult and troublesome to manually conduct such a strict operation.

SUMMARY OF THE INVENTION

It is a first object of the present invention to provide a scanning probe microscope which utilizes the SXM measurement or the SXM and measures or controls an inclination of a plane to be scanned in order to enhance the measurement precision or the recording and reproducing precision.

It is a second object of the present invention to provide a recording and reproducing apparatus and an inclination measurement mechanism having such a measurement or control function.

In order to achieve the above objects, the scanning probe microscope of the present invention which measures a surface status of a sample by scanning a surface status detecting probe on the sample comprises an inclination mechanism for inclining the sample relative to a scan direction of the probe, a detection circuit for selectively detecting a signal component having an optional space frequency from signal components corresponding to the surface status detected by the probe, and a control circuit for controlling the inclination mechanism in accordance with the detection result of the detection circuit.

The recording and reproducing apparatus of the present invention for recording and/or reproducing information to and/or from a recording medium by scanning a probe on the recording medium comprises an inclination mechanism for inclining the recording medium relative to a scan direction of the probe, a detection circuit for selectively detecting a signal component having an optional space frequency from signal components from the recording medium detected by the probe and a control circuit for controlling the inclination mechanism in accordance with the detection result of the detection circuit.

The inclination mechanism of the present invention comprises an information detecting probe for scanning an information bearing article, a detection circuit for selectively detecting a specific signal component from signals related to the information bearing article, detected by the probe, and inclination measurement means for measuring an inclination of the information bearing article relative to the probe in accordance with the detection result of the detection circuit.

The scanning probe microscope, the recording and reproducing apparatus and the inclination measurement mechanism of the present invention select a signal component having an optional space frequency from the signal components representing the surface status detected by the probe and control or measure the inclination in accordance with the detected signal.

DETAILED DESCRIPTION OF THE PREFERRED EMBODIMENTS

The embodiments of the present invention are now explained with reference to FIGS. 3 to 8.

Figure 1:
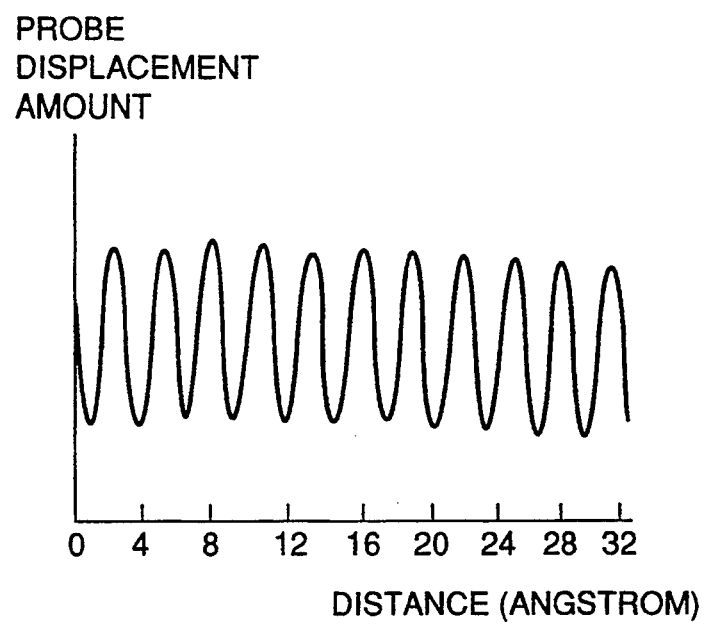
FIG. 1 shows a theoretical signal waveform of a change in the height of a probe.
Figure 2:
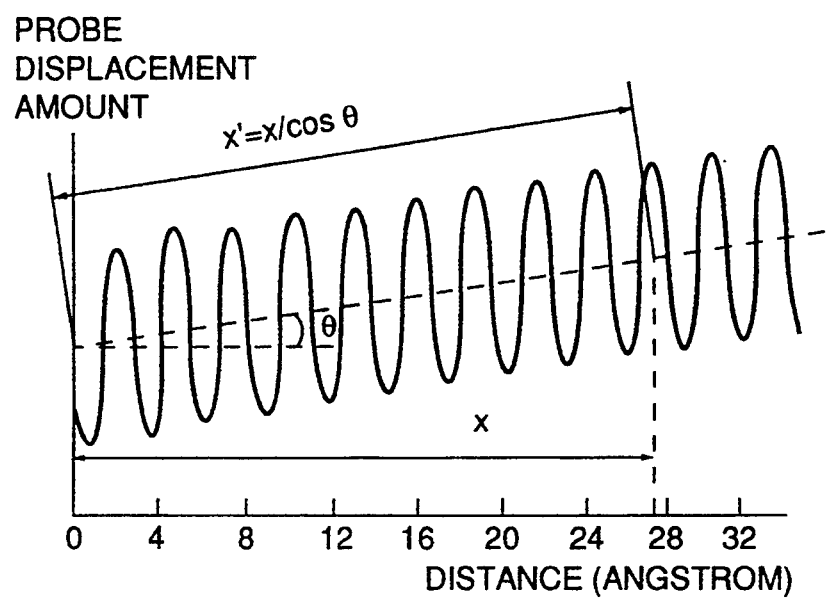
FIG. 2 shows an actual signal waveform of a change in the height of the probe.
Figure 3:
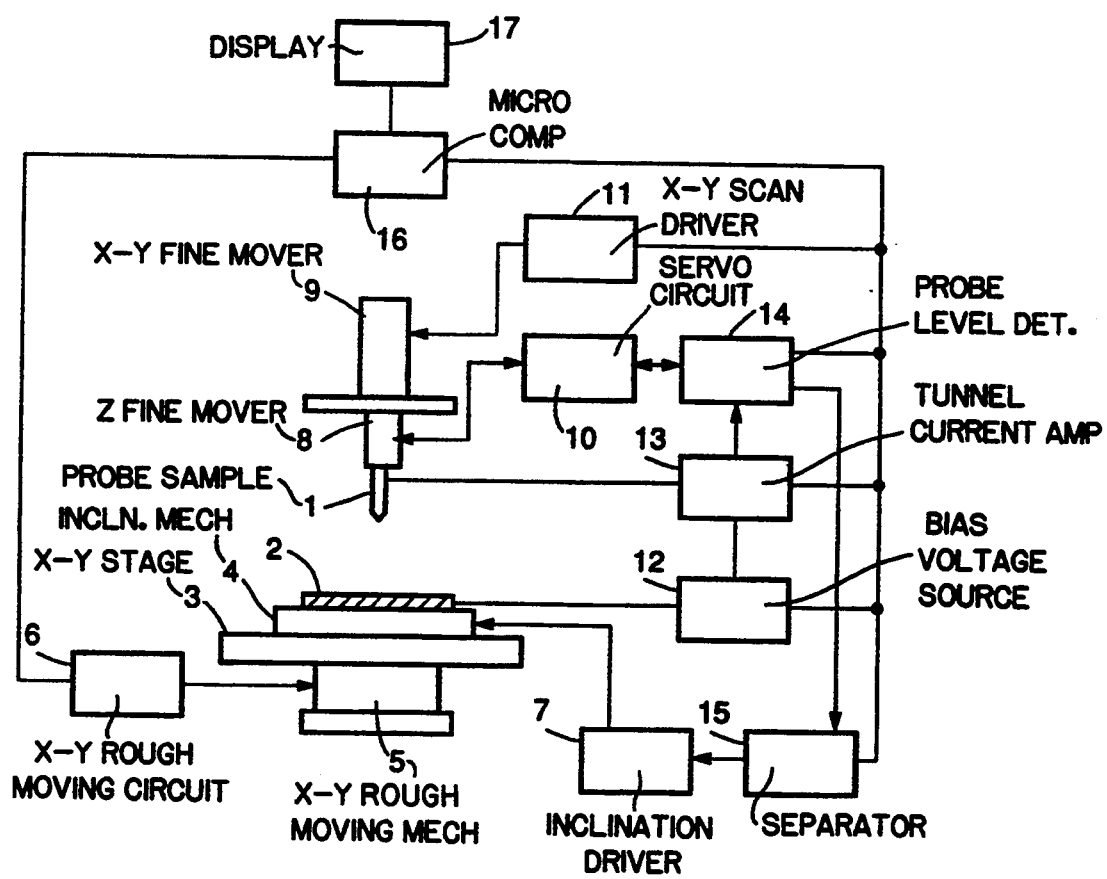
FIG. 3 shows a block diagram of an STM apparatus of the present invention which is one example of a scanning probe microscope.

FIG. 3 shows a block diagram of the STM of the present invention which is one example of the scanning probe microscope. A probe 1 is made of a conductive material such as gold, tungsten, platinum, platinum-iridium alloy, platinum-rhodium alloy, palladium coated gold, silver, tungsten carbide or titanium carbide. A tip end of the probe 1 is preferably as sharp as possible. For example, an end of a tungsten bar having a diameter of 1 mm may be sharpened by an electric field polishing method although the probe 1 may be formed in other method. The number of probe 1 is not limited to one but it may be plural.

A sample 2 to be observed is mounted on a sample table having an XY inclination mechanism 4 on an XY stage 3, which is mounted on an XY rough moving mechanism 5 to which an output of an XY rough movement driving circuit 6 is connected. An XY inclination driving circuit 7 is connected to the XY inclination mechanism 4. The probe 1 is mounted on a Z-direction fine moving mechanism 8 which is finely movable heightwise and an XY fine moving mechanism 9 which is scannable in the X and Y directions. The fine moving mechanisms 8 and 9 use actuators such as piezo-electric elements which permit fine adjustment in the order of an angstrom, and they are driven by a servo circuit 10 and an XY scan driver 11, respectively.

On the other hand, a bias voltage source 12 for applying a bias voltage Vb is connected between the probe 1 and the sample 2 and a tunneling current amplifier 13 for detecting and amplifying a tunneling current Jt is connected therebetween. A probe level detector 14 is connected to the servo circuit 10 and the tunneling current amplifier 13, and an output of the level detector 14 is supplied to the XY inclination driving circuit 7 through a separator 15. A microcomputer 16 for controlling those units and for performing signal processing is connected to the XY rough movement driving circuit 6, the XY scan driving circuit 11, the bias voltage source 12, the tunneling current amplifier 13, the probe level detector 14 and the separator 15. A display circuit 17 for displaying the processed result is connected to the microcomputer 16.

The bias voltage Vb is applied between the probe 1 and the sample 2 by the bias voltage source 12, and the tunneling current Jt flowing between the probe 1 and the sample 2 is detected and amplified by the tunneling current amplifier 13. In any of the constant current mode and the constant height mode, the level signal of the probe 1 detected by use of the microcomputer 16 is separated by the separator 15 to a level component due to a change of evenness or electron status on the surface of the sample 2 and a component caused by the inclination of the sample 2. The latter component is fed back to the XY inclination control mechanism 7 to correct the inclination of the sample 2 on the sample table such that the component is substantially zero.

An inclination correction operation is specifically explained below. The probe 1 is scanned along the X axis direction in either mode to produce the height signal of the sample 2. The probe 1 may be reciprocally scanned on the same line as required. The obtained signal is divided into a plurality of frequency bands including a desired frequency area by the separator 15. A lowest frequency due to the inclination of the sample is normally selected from those frequencies and the inclination of the sample 2 is corrected by use of the XY axis inclination driving circuit 7 such that the amplitude at the selected frequency becomes minimum. The scan may be conducted over an appropriate distance determined by a desired observation area, and the scan and the feedback to the XY inclination driver 7 may be conducted a plurality of number of times as required. The same operation is conducted for the Y axis so that the sample plane (X'Y' plane) becomes parallel to the probe scan plane (XY plane) and the resulting observation output is of high dimensional precision.

A lock-in amplifier may be used to separate the signal of an arbitrary frequency and determine the amplitude of the separated signal component. The lock-in amplifier allows the investigation of the amplitude of the signal component of an arbitrary frequency of the input signal and also allows the investigation of the amplitude of the input signal component having the same frequency as that of an input reference signal. Thus, the inclination of the sample 2 may be more easily detected by using the sweep signal of the probe 1 as the reference signal.

As for XY inclination mechanism 4, such a mechanism is applicable that the two-axis control of the inclination of the sample may be finely and precisely conducted, and it is convenient to adapt an XY inclination stage or an XY goniometer type. The former is a three-point supported stage and the heights of at least two of the three support points are variable. The inclination of the stage plane may be changed by adjusting them. The length of the support points may be changed by a mechanical method such as a micrometer head or by a piezo-electric element. The latter XY goniometer attains the two-axis inclination rotation by combining two goniometers which permit the inclination rotation of the stage. While it permits only small range of change, it is preferable since it attains finer control. Where the observation area is wide, the former is preferable.

Figure 4:
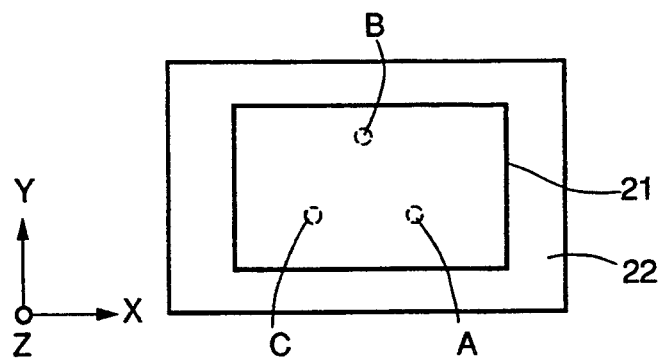
FIG. 4 shows a construction of an XY inclination stage shown in FIG. 3.
Figure 4:
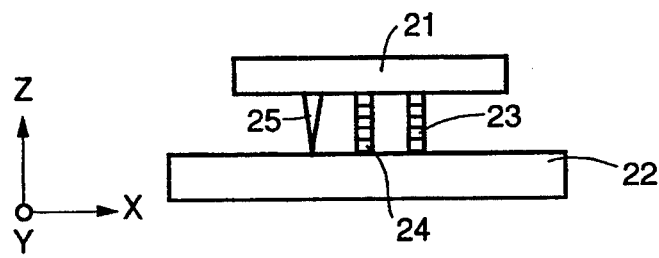

FIG. 4 shows an example of the XY inclination mechanism 4. The stage 21 is supported by three points on a reference plane 22. The two points A and B are supported by piezo-electric elements 23 and 24 and the distance between the reference plane 22 and the stage 21 may be varied in the order of angstrom. The remaining support point C makes a point contact to the reference plane 22 by a projection 25 so that the free movement of the stage 21 for the movement of the piezo-electric elements 23 and 24 is not impeded. The three support points A, B and C are positioned at vertexes of a regular triangle on the reference plane 22 and the support points C and A are arranged to be parallel to the X axis direction of the XY stage 3.

Figure 5:
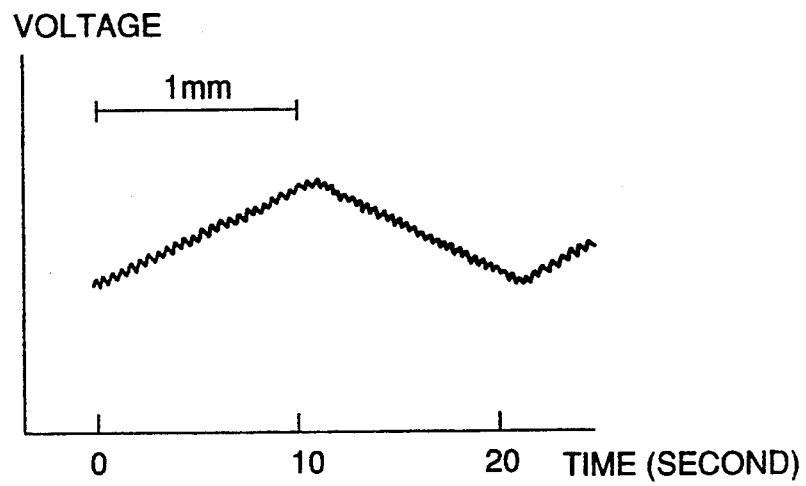
FIG. 5 shows a voltage signal waveform applied to a Z-axis fine adjustment mechanism shown in FIG. 3.

Highly oriented graphite (HOPG) having an area of 10 mm square was used as the sample 2 to conduct an experiment to confirm the effect of the STM of the present invention. The probe 1 is made of platinum-rhodium alloy (rhodium 20%) having a diameter of 1 mm which is machine-ground. The HOPG is mounted on the XY inclination stage 21, the sample bias of 1 volt is applied as the bias voltage Vb and the probe 1 is directed to approach the sample by the XY direction fine moving mechanism 9 so that the tunneling current Jt reaches 1 nA. Then, the probe 1 is reciprocally scanned along the X axis direction over the length of 1 mm at the sweep frequency of 0.1 Hz in the constant current mode in which the level of the probe 1 is controlled by the servo circuit 13 so that the tunneling current Jt is kept constant. A voltage signal waveform applied to the XY direction fine moving mechanism 9 through the servo circuit 10 is shown in FIG. 5. The signal is separated through the separator 15 into a signal component having a frequency of 0.12 Hz and a signal component having a higher frequency. The height of the support point A is adjusted so that the signal component having the frequency of lower than 0.12 Hz is substantially zero, while the sweep of the probe 1 is continued. Similarly, the probe 1 is swept along the Y axis direction at the sweep frequency of 0.1 Hz. The height of the support point B is adjusted such that the frequency component of lower than 0.12 Hz of the voltage signal applied to the XY fine moving mechanism 9 is substantially zero.

After the above operation, the area of 200 Å square on the surface of the HOPG was scanned and a distortion-free image having a second proximate carbon atom distance of 2.46 angstrom was detected in any one of the constant current mode and the constant distance mode. Similar observation was made at a point spaced from the above observation area by 0.5 mm along the X axis direction. A distortion-free atom image was al so detected.

In accordance with the present invention, the STM image with a high dimensional precision is obtainable over a wide area. Once the surface of the sample 2 and the scan plane of the probe 1 are made parallel, the risk of collision of the probe 1 to the sample 2 during the scan is avoided and the correction operation of the position of the Z-axis direction of the probe 1 is reduced. Accordingly, the sample can be observed at a higher sweep speed.

The present invention is effective to not only the measurement of the tunneling currents Jt at various points but also to a scanning tunneling spectrometer (STS) method in which the tunneling currents Jt and the respective points are differentiated by the bias voltage Vb.

Figure 6:
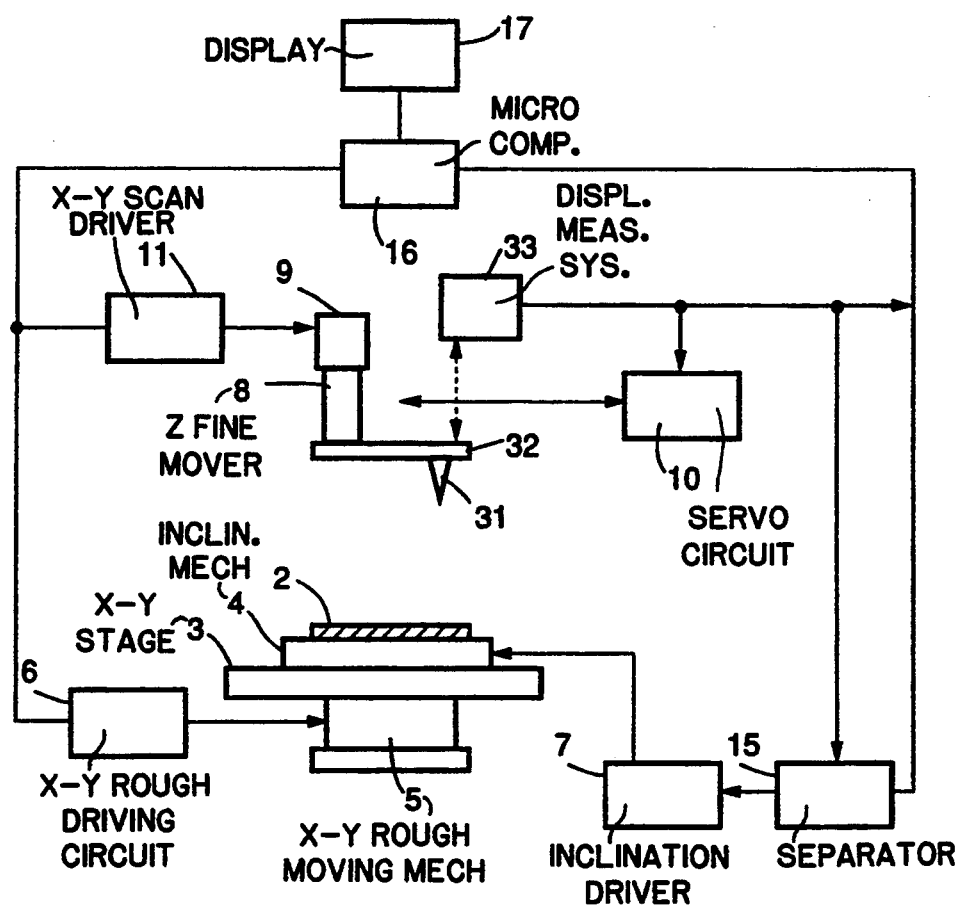
FIG. 6 shows a block diagram of an AMF apparatus of the present invention which is another example of the scanning probe microscope.

The present invention is further applicable to other SXM having the same drive mechanisms for the sample and the probe as those of the STM, for example, a scanning atomic force microscope (AFM) which detects the structure of the sample surface by measuring an atomic force acting between the probe and the sample to apply a feedback to maintain the atomic force constant. When the present invention is applied to the AFM, a force detection probe 31 having a cantilever 32 attached thereto instead of the probe 1 of the ATM as shown in FIG. 6 is used. For example, the force detection probe 31 may be a diamond needle and the cantilever 32 may be a $Si_3N_4$ thin film having an elastic .constant of 0.5 N/m. A cantilever displacement measurement system 33 for measuring a displacement of the cantilever 32 may be one of various known systems and an optical lever system is preferable. In the AFM, the bias voltage source and the tunneling current amplifier in the STM are not required because the tunneling current is not measured but other elements having the same reference numerals assigned thereto are identical to those of the embodiment of the STM.

Figure 7:
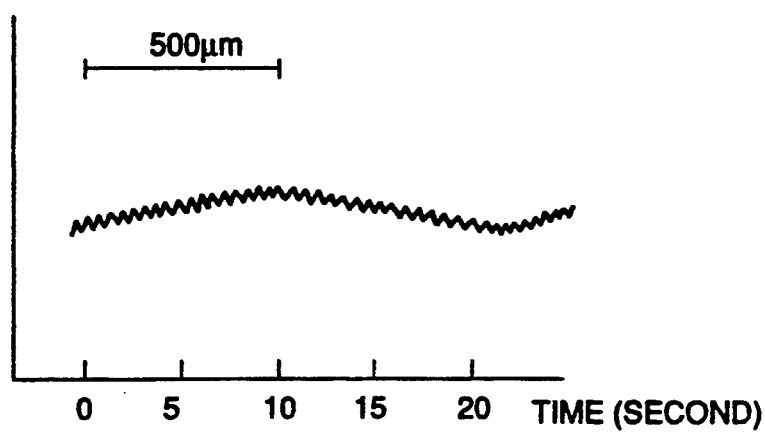
FIG. 7 shows a signal waveform of a displacement of a cantilever shown in FIG. 6.

An experiment to confirm the effect of the present invention when it was applied to the AFM was conducted with a good result. A compact disk is mounted on the XY inclination mechanism 4 as the sample 2 and the force detection probe 31 is approached to the sample 2 by the XY direction fine moving mechanism 9 until the affinity reaches $10^{-7}$ N/m. The force detection probe 31 is then reciprocally scanned along the X axis direction over the length of 0.5 mm at the sweep frequency of 0.1 Hz. The displacement signal of the cantilever 32 detected by the cantilever displacement measurement system 33 is shown in FIG. 7.

This signal is separated by the separator 15 to the frequency component of lower than 0.12 Hz and the frequency component of high than that, and the inclination along the X axis direction is adjusted by the XY inclination mechanism 4 such that the signal component having the frequency of lower than 0.12 Hz is substantially zero while the sweep of the force detecting probe 31 is continued. Similar adjustments are made while the sweep distance is expanded to 1 mm, 2 mm and 5 mm sequentially. Similarly, the force detection probe 31 is swept along the Y axis direction over the distance of up to 5 mm at the sweep frequency of 0.1 Hz and the inclination along the Y axis direction is adjusted so that the frequency component of lower than 0.12 Hz of the cantilever displacement signal is substantially zero.

After the above operation, an area of 50 μm square on the surface of the sample 2 was scanned and an image without recording bit distortion was detected. Similar measurement was made at a point spaced from the above observation point by 3 mm along the X axis and the Y axis directions, and the recording bit image without direction was detected. In this manner, the AMF image without distortion can be observed over a wide area.

When the adjustment of the XY inclination mechanism 4 was omitted, the measurement at the first 50 μm square observation area was successful but the observation at the point spaced from the above observation area by 3 mm along the X axis and the Y axis directions was not successful because the force detection probe 31 collided the sample 2.

The present invention is also applicable to a scanning magnetic force microscope (MFM) which measure a local magnetic force on a sample by using a ferromagnetic material such as iron or nickel or an probe made of other material coated with the ferromagnetic material as the probe in the AFM, a scanning ion conductance microscope (SICM) which measures a sample surface structure in electrolytic solution by a change in an ion conductivity by using a micropipet electrode as the probe, a scanning type acoustic microscope (STUM or STAM) which measures a surface structure of a sample by utilizing a change in an amplitude or a phase of an ultrasonic wave reflected by the sample surface and returned to the probe while the probe is vibrated by the ultrasonic wave or measuring an acoustic wave generated in the sample in accordance with a magnitude of an atomic force acting on the probe vibrated by the ultrasonic wave and the sample surface, and a scanning proximate field optical microscope (NSOM) which uses an optical probe having a pinhole having a diameter smaller than a wavelength of a light and detects an evanescent light created on the sample surface when the sample is irradiated by an external light source, by the optical probe to detect the surface structure of the sample.

Figure 8:
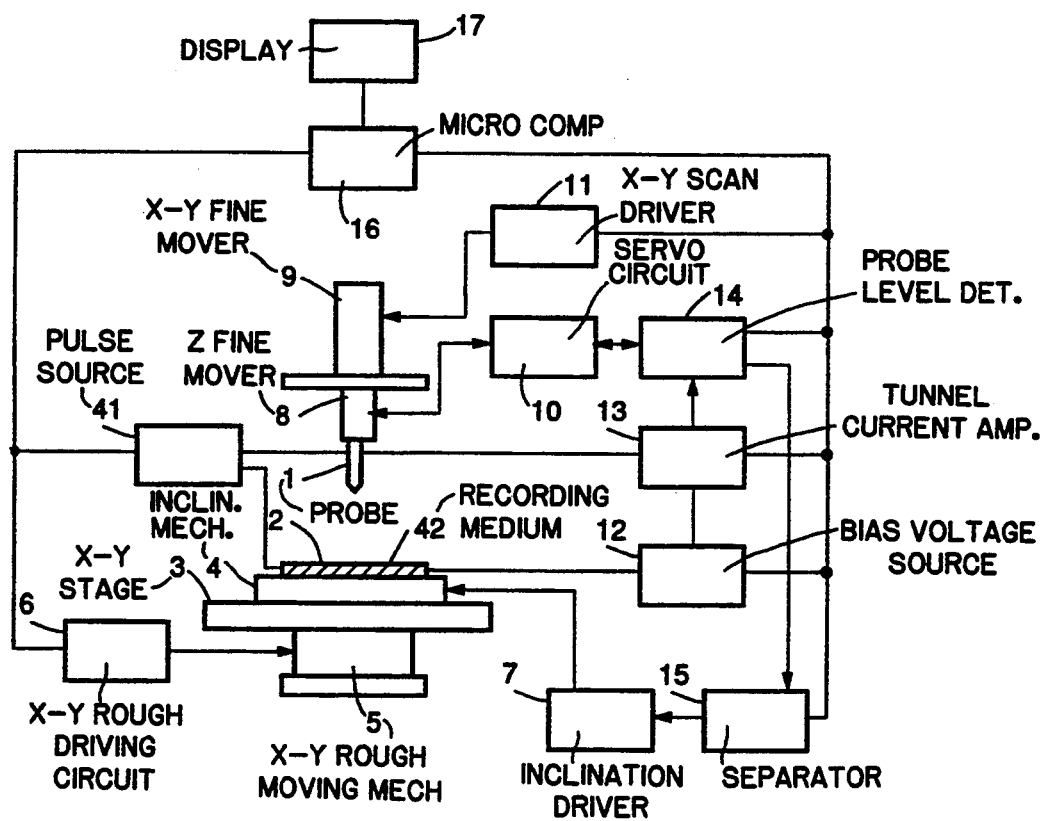
FIG. 8 shows a block diagram of an information recording and reproducing apparatus of the present invention.

The present invention is further applicable to a high density recording and reproducing apparatus which records, reproduces and erases information to and from the sample as the recording medium by using the STM or the SXM of the same principle. FIG. 8 shows a recording and reproducing apparatus which uses the STM. Basically, it is identical to the STM apparatus shown in the previous embodiment but it differs therefrom in that it is provided with a pulse source 41 for recording and reproducing information and it uses a recording medium 42 instead of the sample 2. The probe 1 is used for recording and reproducing information and it may be a gold (Au) bar having a diameter of 0.3 mm which is electric-field polished in hydrochloric acid. The XY inclination mechanism 4 may be identical to that shown in FIG. 4. The recording medium 42 may be formed by epitaxially vapor-depositing Au with thickness of 5000 angstrom at a substrate temperature of 450° C. on a cleaved mica.

An experience to confirm the effect of the present invention when the present invention was applied to such a recording and reproducing apparatus was conducted with a good result. After setting the recording medium 42 on the XY inclination mechanism 4 as mentioned above, the bias voltage Vb of 100 mV is applied and the probe 1 is approached to the recording medium 42 by use of the XY fine moving mechanism 9 so that the tunneling current Jt reaches 0.1 nA. Then, the probe 1 is reciprocally scanned over the distance of 500 μm along the X axis direction at the sweep frequency of 0.1 Hz while the level of the probe 1 is controlled by the servo circuit 10 in the constant current mode so that the tunneling current Jt is maintained constant. The voltage signal applied to the XY fine moving mechanism 9 through the servo circuit 10 is separated by the separator 15 to the frequency component of lower than 0.12 Hz and the frequency component of higher than 0.12 Hz. The probe 1 is continuously swept and the height of the support point A is adjusted such that the signal component having the frequency lower than 0.12 Hz is substantially zero. Similarly, the probe 1 is swept along the Y axis direction at the sweep frequency of 0.1 Hz and the height of the support point B is adjusted by the piezo-electric element 24 so that the frequency component of lower than 0.12 Hz of the voltage signal applied to the XY fine moving mechanism 9 is substantially zero.

After the above operation, a voltage of +4.0 V having a pulse width of 300 nS was applied from the pulse source 41 while the level of the probe 1 was kept constant at a first position on the recording medium 42. Then, an area of 300 angstrom square area centered at the voltage application point was observed in the constant current mode. It was confirmed that a projection of 100 angstrom in diameter and 20 angstrom in height was formed to record information.

Information was recorded in a similar manner at a second point spaced from the first point by 50 μm along the X axis direction. It was confirmed that information was recorded without error at a third point spaced from the second point by 50 μm along the Y axis direction, and a fourth point spaced from the third point by −50 μm along the X axis direction. The probe 1 was then moved to the first position spaced from the fourth position by −50 μm along the Y axis direction to confirm the completion of the recording at the first position. This means that the probe 1 exactly returned to its original first point. This is confirmation of very high precision of the position control.

In accordance with the present invention, the positional precision of the recording bit is significantly improved so that the recording, reproducing and erasing can be done with a high precision. Where the recording medium 42 is large or the recording area is wide, the present invention is very effective. The recording and reproducing apparatus may be a recording-only apparatus or a reproducing-only apparatus.

The scanning probe microscope, the recording and reproducing apparatus and the inclination measuring mechanism of the present invention have the following advantages.

(1) In the scanning probe microscope for finely detecting a surface status of the sample, the observation with very high precision is attainable over a wide area.
(2) In the recording and reproducing apparatus, the highly positional precision recording and reproduction are attainable and highly reproduceable recording and reproduction are attained.
(3) In the inclination measurement mechanism, the inclination measurement which is easy to use and provides a high precision is attained.

What is claimed is:
1. A scanning probe microscope for measuring a surface status of a sample by scanning the sample with a probe, comprising:
a probe;
an inclination means for inclining the sample disposed to face said probe relative to a scanning surface defined by the scanning of said probe;
moving means for performing relative movement between said probe and the sample so as to reciprocally scan the sample with said probe;
detection means for detecting a signal corresponding to surface information of the sample utilizing said probe upon scanning the sample with said probe;
extraction means for extracting a low frequency signal from said detected signal; and control means for controlling said inclination means on the basis of said low frequency signal so that a level of said low frequency signal extracted by said extraction means becomes lower in order to make an angle defined by said scanning surface of said probe and the surface of the sample smaller.

2. A scanning probe microscope according to claim 1, wherein said inclination means utilizes a goniometer.

3. A scanning probe microscope according to claim 1, wherein said inclination means utilizes at least two piezo-electric elements.

4. A scanning probe microscope according to claim 1, wherein said scanning probe microscope is a scanning probe tunneling microscope which utilizes a tunneling current caused between said probe and the sample.

5. A scanning probe microscope according to claim 1, wherein said scanning probe microscope is a scanning interatomic microscope which utilizes an internatomic force caused between said probe and the sample.

6. A scanning probe microscope according to claim 1, wherein said scanning probe microscope is a scanning magnetic force microscope which utilizes a magnetic force caused between said probe and the sample.

7. A scanning probe microscope according to claim 1, wherein said scanning probe microscope is a scanning ion conduction microscope which utilizes an ion conduction caused between said probe and the sample.

8. A scanning probe microscope according to claim 1, wherein said scanning probe microscope is a scanning acoustic microscope which utilizes acoustics caused between said probe and the sample.

9. A scanning probe microscope according to claim 1, wherein said scanning probe microscope is a scanning proximity field optical microscope which utilizes an evanescent light caused between said probe and the sample.

10. A scanning probe microscope according to claim 1, wherein said extraction means is a lock-in amplifier.

11. A scanning probe microscope according to claim 1, wherein said control means controls said inclination means before measuring the surface status of the sample by said probe.

12. An apparatus for recording and/or reproducing information on and/or from a recording medium by scanning the recording medium with a probe, comprising:

a probe;

inclination means for inclining the recording medium disposed to face said probe relative to a scanning surface defined by the scanning of said probe;

moving means for performing relative movement between said probe and the recording medium so as to reciprocally scan the recording medium with said probe;

detection means for detecting a signal corresponding to surface information of the recording medium utilizing said probe upon scanning the recording medium with said probe;

extraction means for extracting a low frequency signal from said detected signal; and control means for controlling said inclination means on the basis of said low frequency signal so that a level of the low frequency signal extracted by said extraction means becomes lower in order to make an angle defined by said scanning surface of said probe and the surface of the recording medium smaller.

13. An apparatus according to claim 12, wherein said control means controls said inclination means before effecting recording to information or reproduction of information on or from the recording medium by said probe.

* * * * *

UNITED STATES PATENT AND TRADEMARK OFFICE
CERTIFICATE OF CORRECTION

PATENT NO. : 5,391,871
DATED : February 21, 1995
INVENTOR(S) : HIROSHI MATSUDA ET AL.

It is certified that error appears in the above-indentified patent and that said Letters Patent is hereby corrected as shown below:

ON THE TITLE PAGE

At [56] References Cited

Under "U.S. PATENT DOCUMENTS"

"02147803   6/1990 Japan." should read --2-147803   6/1990 Japan.-- and "2147803   8/1990 Japan." should be deleted.

At [57] ABSTRACT

Line 5, "by a" should read --by an--.

COLUMN 5

Line 57, "al so" should read --also--.

COLUMN 6

Line 19, ".constant" should read --constant--.
Line 43, "high" should read --higher--.

COLUMN 7

Line 5, "measure" should read --measures--.
Line 7, "an" should read --a--.

UNITED STATES PATENT AND TRADEMARK OFFICE
CERTIFICATE OF CORRECTION

PATENT NO. : 5,391,871
DATED : February 21, 1995
INVENTOR(S) : HIROSHI MATSUDA ET AL.

Page 2 of 2

It is certified that error appears in the above-indentified patent and that said Letters Patent is hereby corrected as shown below:

COLUMN 8

Line 48, "reproduceable" should read --reproducible--.

COLUMN 9

Line 18, "internatomic" should read --interatomic--.

Signed and Sealed this

Thirteenth Day of June, 1995

Attest:

BRUCE LEHMAN

Attesting Officer

Commissioner of Patents and Trademarks